United States Patent
Walker

(10) Patent No.: US 6,322,603 B1
(45) Date of Patent: Nov. 27, 2001

(54) PARTICULATE COLLECTOR CHANNEL WITH COOLING INNER ELEMENTS IN A CFB BOILER

(75) Inventor: David J. Walker, Wadsworth, OH (US)

(73) Assignee: The Babcock & Wilcox Company, New Orleans, LA (US)

( * ) Notice: Subject to any disclaimer, the term of this patent is extended or adjusted under 35 U.S.C. 154(b) by 0 days.

(21) Appl. No.: 09/613,132

(22) Filed: Jul. 10, 2000

(51) Int. Cl.⁷ .................. B01D 45/08; B09B 3/00
(52) U.S. Cl. .................. 55/444; 55/434.4; 55/443; 110/216; 122/4 D
(58) Field of Search .................... 55/434.4, 443, 55/444; 110/216; 165/104.12, 134.1; 422/146; 122/4 D

(56) References Cited

U.S. PATENT DOCUMENTS

| | | | |
|---|---|---|---|
| 4,830,644 * | 5/1989 | Gutermuth | 55/444 |
| 4,891,052 * | 1/1990 | Belin et al. | 55/444 |
| 4,951,611 * | 8/1990 | Abdulally et al. | 110/216 |
| 4,992,085 * | 2/1991 | Belin et al. | 55/444 |
| 5,025,755 * | 6/1991 | Eickvonder et al. | 110/216 |
| 5,352,257 * | 10/1994 | Powers | 55/444 |
| 5,378,253 * | 1/1995 | Daum et al. | 122/4 D |
| 5,391,211 * | 2/1995 | Alliston et al. | 110/216 |
| 5,435,820 * | 7/1995 | Daum et al. | 122/4 D |
| 5,601,039 * | 2/1997 | Hyppanen | 110/216 |
| 5,809,940 * | 9/1998 | James et al. | 55/444 |

* cited by examiner

Primary Examiner—David A. Simmons
Assistant Examiner—Minh-Chau T. Pham
(74) Attorney, Agent, or Firm—Eric Marich

(57) ABSTRACT

An apparatus for separating solids from flue gas in a circulating fluidized bed (CFB) boiler includes a plurality of impact type particle separators mounted vertically to a wall of the CFB. The impact type particle separators being adjacently positioned and horizontally spaced. Each impact type particle separator includes a plurality of vertically mounted cooling tubes connected to a fluid circulating system. A slip fit element surrounds the cooling tubes. A cup shaped configuration is formed by side walls and a back wall. The side walls and back wall have a plurality of separate vertically aligned segments extending along the height of the impact type particle separator. Each vertically aligned segment is connected at its ends to an adjacent segment.

10 Claims, 5 Drawing Sheets

RH SIDE VIEW

REAR VIEW

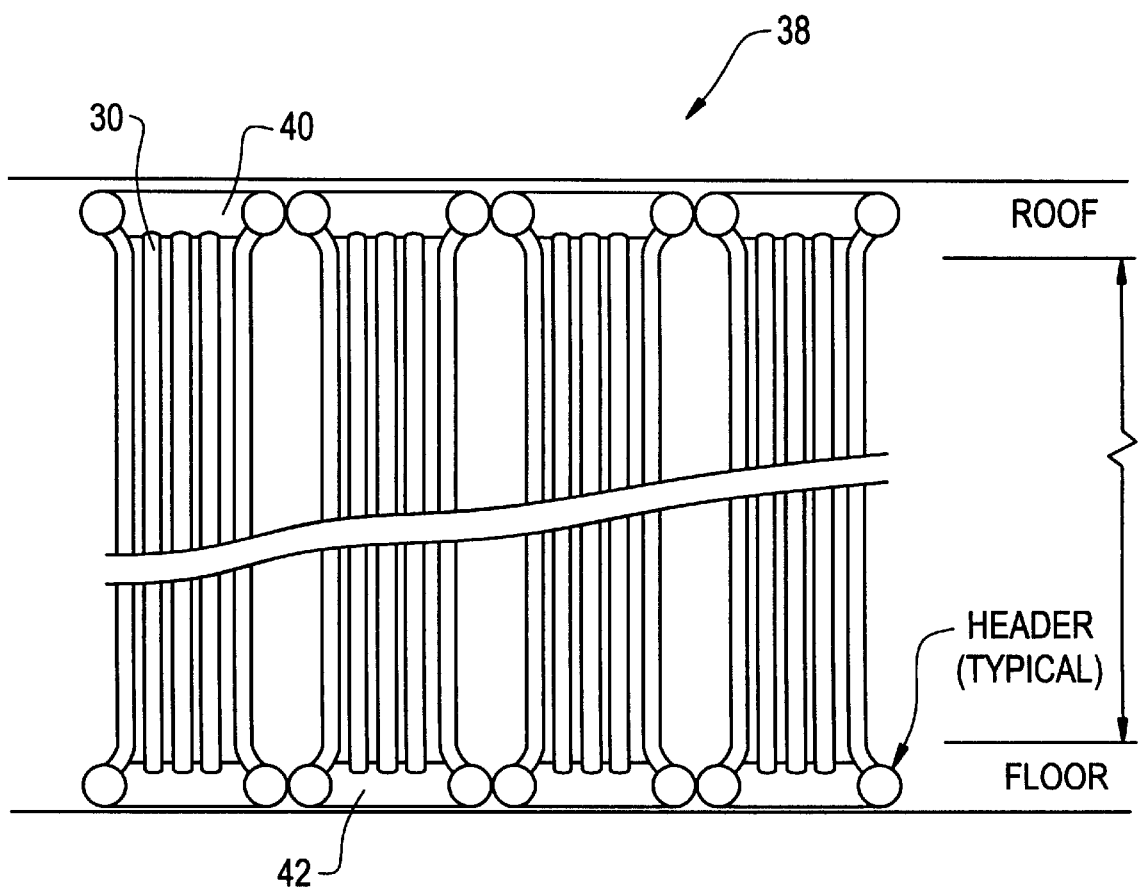

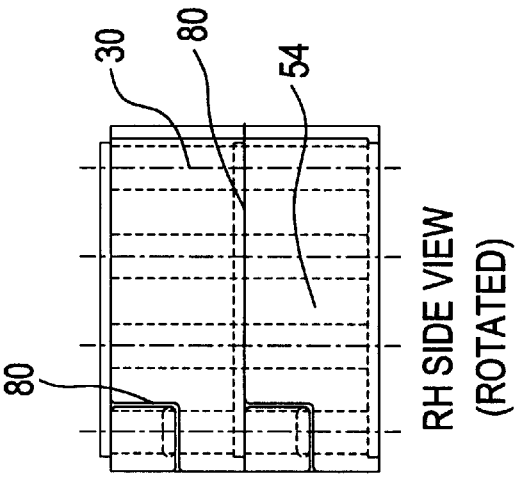
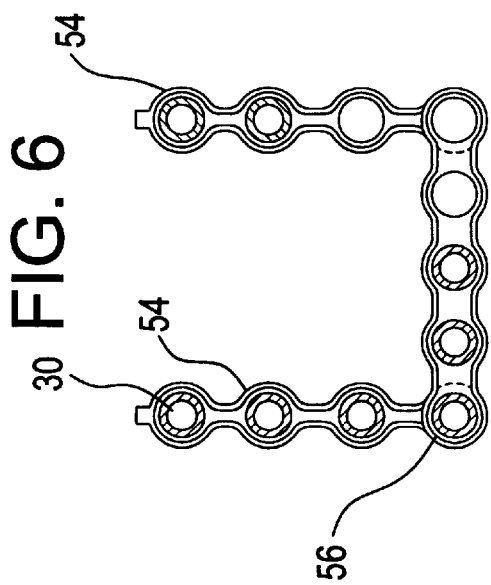
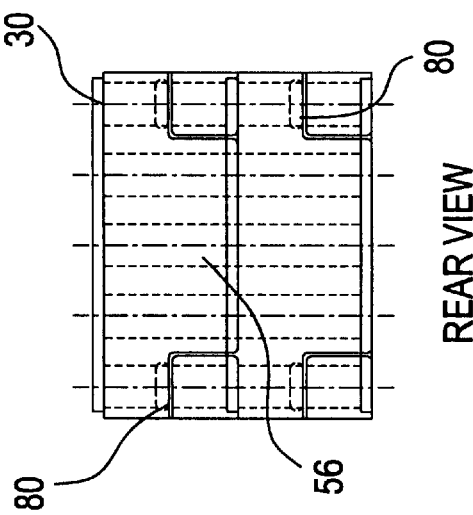
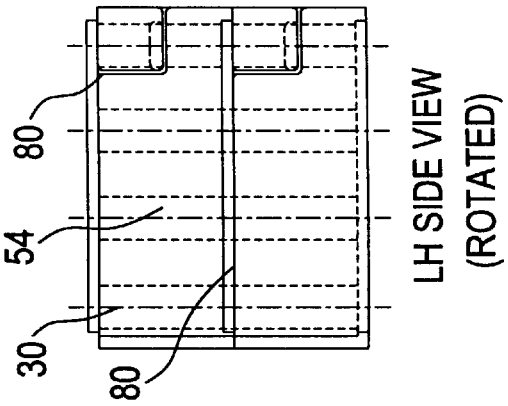

RH SIDE VIEW
(ROTATED)

REAR VIEW

LH SIDE VIEW
(ROTATED)

PARTICULATE COLLECTOR CHANNEL WITH COOLING INNER ELEMENTS IN A CFB BOILER

FIELD AND BACKGROUND OF THE INVENTION

The present invention relates, in general, to the field of circulating fluidized bed (CFB) boilers and, in particular, to an improved impact type particle separator which is cooled by inner cooling tubes.

In the CFB power plant field, the separation of solids which are entrained within the flue gas, and the recycle system for returning these solids to a bed of the CFB boiler, are critical to the efficient operation of the boiler. The separation and recycle system has a great impact on the capital and operating costs of the CFB boiler and its ability to follow variations in loads.

Presently known systems for separating the solids from the flue gas in a CFB boiler include an impact type particle separator system. An impact type particle separator system uses an impact primary particle separator in conjunction with a furnace which channels solids/gas flow to the impact type particle separator. Solids are collected by the impact type particle separator and recycled to the furnace.

Often, the separators have collecting elements made of one or more plates shaped and placed in staggered arrays to present a path which may be navigated by the gas stream, but not the entrained particles. One CFB boiler arrangement uses a plurality of impact type particle separators (or concave impingement members or U-beams) at the furnace exit to separate particles from the flue gas. While these separators can have a variety of configurations, they are commonly referred to as "U-beams" because they most often have a U-shaped configuration in cross-section. When applied to a CFB boiler, a plurality of such impact type particle separators are supported within the furnace enclosure and extend vertically in at least two rows across the furnace exit opening, with collected particles falling unobstructed and unchanneled underneath the collecting members along the rear enclosure wall. The gap between each adjacent pair of U-beams in one row is aligned with a U-beam in a preceding or following row of U-beams to present a tortuous path for the flue gas/solids to navigate. The U-beams in each row collect and remove particles from the flow of flue gas/solids, while the flue gas stream continues to flow around and through the U-beam array.

U.S. Pat. No. 4,992,085 to Belin et al. discloses an internal impact type particle separator employing a plurality of U-shaped impingement members organized in at least two staggered rows and positioned in the stream of a flue gas for entraining solid particles.

U.S. Pat. No. 5,025,755 to Eickvonder et al. discloses a labyrinth separator having staggered beams having essentially a U-shaped cross-section configuration. The labyrinth separator is located in a top region of the fluidized bed reactor.

These types of collection elements are generally relatively long in comparison to their width and depth. The shape of the collection elements is usually dictated by two considerations: namely, the collection efficiency of the U-beams themselves and the ability of the U-beams to be self-supporting. When these elements are used, they are generally placed at the furnace exit and not cooled. Their placement at the furnace outlet is to protect the downstream heating surfaces from erosion by solid particles. Thus, the U-beams are exposed to the high temperatures of the flowing stream of flue gas/solids, and the materials used for the U-beams must be sufficiently temperature resistant to provide adequate support and resistance to damage.

Long, self-supporting stainless steel plate channels have been successfully used in CFB boilers for the primary solids collector. The use of higher furnace temperatures would be desirable but limitations of the long term "creep" strength of the commercially available and suitable alloys makes the use of higher temperatures less economical since increased thickness (and, therefore, increased weight) of the plate used in the collection elements is required. The associated increases in the weight of the thicker, longer channel must be carried by the plate making up the channel, as well as by the overall U-beam supports. By breaking up the long collection channel into short segments, the required strength of each short segment is much less than for the long channel due to the series of intermittent supports and the small amount of weight of any individual segment or element.

Methods of making collection elements which are cooled or supported off a cooled structure have usually included collection plates welded to water cooled support tubes. See U.S. Pat. Nos. 5,378,253 and 5,435,820 to Daum et al. However, welding to the cooling tubes increases the opportunity for tube leaks to occur at the welds.

In addition, under this known design structure, the collection element is cooled asymmetrically due to the proximity of the cooled tube or tubes to only some portion of the shaped collection channel segment or element. Thus, the plate forming the collection elements will tend to distort due to the differential expansion of the cooler areas in comparison to the hotter portions of the collection elements.

In addition, it is necessary to protect the tubes themselves from erosion caused by the impacting solids entrained within the solid/gas flow. This protection requires the use of tube shields made of stainless steel, ceramic or other heat resistant alloy or material which must be used along the entire height of the collector, which adds further cost.

SUMMARY OF THE INVENTION

The present invention alleviates the problems associated with the known U-beams configuration by employing segments or elements which slip over loose tubes and which form the sides and back of the collection shape, typically a U-beam. The slip-fit elements are cooled by the inner cooling tubes and are held in position with respect to each other so bottom support or intermediate support for the segments or elements is made possible.

Accordingly, one aspect of the present invention is to provide a configuration of an impact type particle separator in combination with inner cooling elements for use in the hot regions of a circulating fluidized bed boiler.

Another aspect of the present invention is to provide protection to the inner cooling elements, advantageously water-cooled tubes, from erosion.

Yet another aspect of the present invention is to provide for the ability of the impact type particle separator elements to expand and contract with respect to each other while being maintained in alignment by the inner cooling tubes.

Yet still another aspect of the present invention is to provide a symmetrical temperature distribution along the impact type particle separator collection elements which will minimize distortion of the collection elements themselves. The present invention is easily assembled and requires minimal welding requirements while still preserving the functional U-shape of the impact type particle separator collection elements.

Accordingly, one aspect of the present invention is drawn to an apparatus for separating solids from flue gas in a circulating fluidized bed (CFB) boiler, the apparatus comprising: a plurality of separators mounted vertically to a wall of the CFB. The separators, being adjacently positioned and horizontally spaced with respect to one another, include a plurality of vertically mounted cooling tubes connected to a fluid circulating system. A slip fit element surrounds the cooling tubes. The slip fit element has a cup shaped configuration which is formed by side walls and a back wall. The side walls and back wall have a plurality of separate vertically aligned segments which extend along the height of the separator. Each vertically aligned segment is connected at its ends to an adjacent segment.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 5 is a schematic side view of the fluid circulating system;

FIG. 6 is a top view of a second embodiment of an impact type particle separator according to the present invention;

FIG. 7 is a left side view of the impact type particle separator of FIG. 6;

FIG. 8 is a rear view of the impact type particle separator of FIG. 6;

FIG. 9 is a right side view of the impact type particle separator of FIG. 6;

DESCRIPTION OF THE PREFERRED EMBODIMENTS

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process. Similarly, the term U-beam is used in the following discussion for the sake of convenience, and is meant to refer broadly to any type of concave impingement members or impact type particle separators used to collect and remove particles from a particle laden flue gas. Particularly, the impact type particle separators are non-planar; they may be U-shaped, E-shaped, W-shaped, or any other shape as long as they have a concave or cupped surface which is presented to the oncoming flow of flue gas and entrained particles which will enable the members to collect and remove particles from the flue gas.

Figure 1:
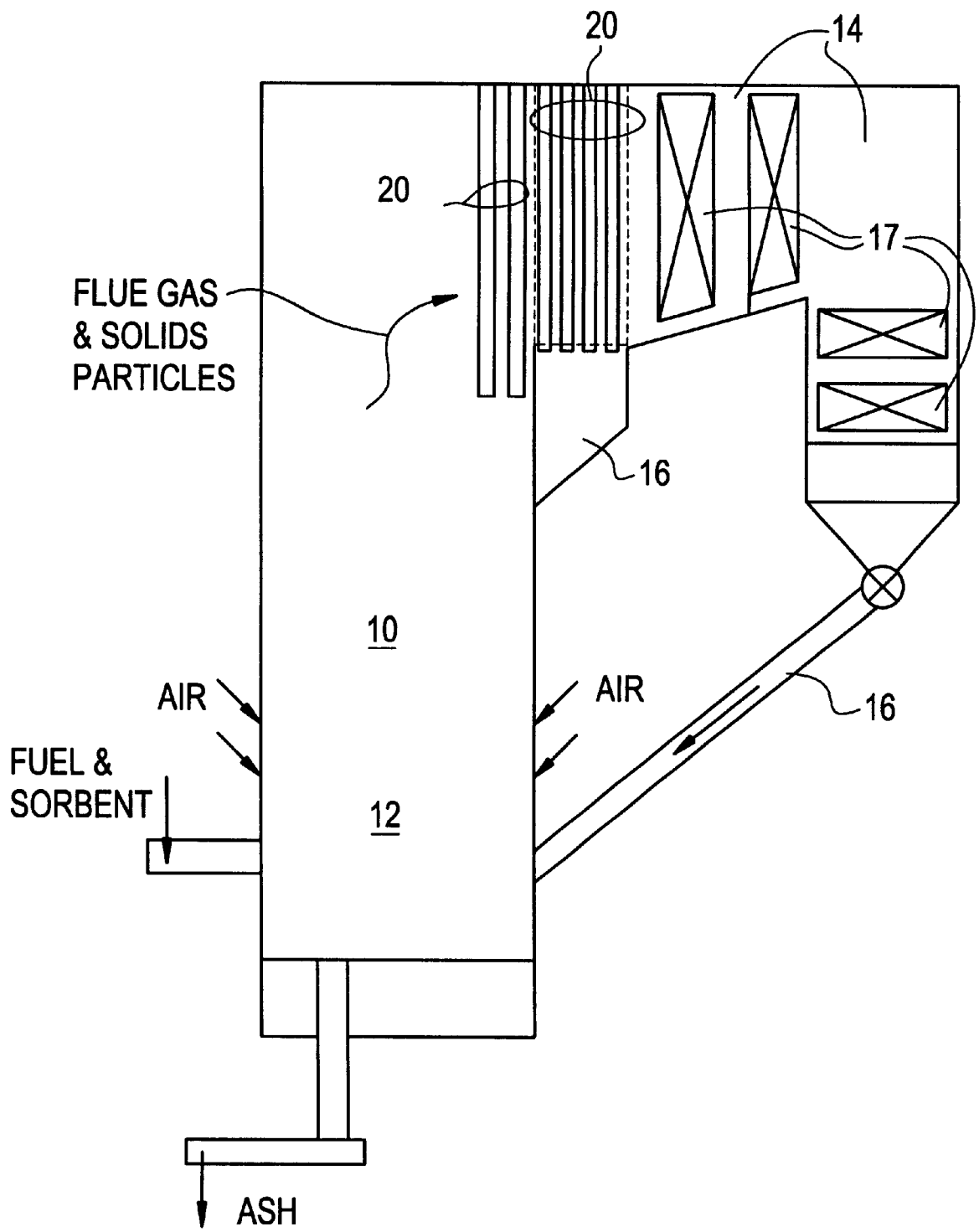
FIG. 1 is a schematic view of a known CFB boiler design employing an impact type particle separator system.

Referring now to the drawings, in which like reference numerals are used to refer to the same or functionally similar elements, FIG. 1 shows a furnace, generally designated 10, containing circulating fluidized bed 12, exhaust flue 14, and particulate return 16. Combustion of fuels occurs in circulating fluidized bed 12, generating hot waste gases which are laden with particulate matter. The hot gases rise through furnace 10 to exhaust flue 14 containing heat transfer surfaces 17 such as superheater, reheater and economizer. The gases are then conveyed to downstream heat removal and cleaning stages (not shown) and then to the atmosphere.

Rows of staggered, impact type particle separators 20 are oriented in the upper part of furnace 10. Particulate matter entrained in flue gas strikes impact type particle separator 20, becomes separated and free-falls directly back into the circulating fluidized bed 12, where further combustion or reaction of the recycled particulate can occur. Generally, the impact type particle separators 20 are nonplanar and preferably U-shaped in cross-section, but they may be E-shaped, W-shaped or of some similar concave or cupped configuration.

Figure 2:
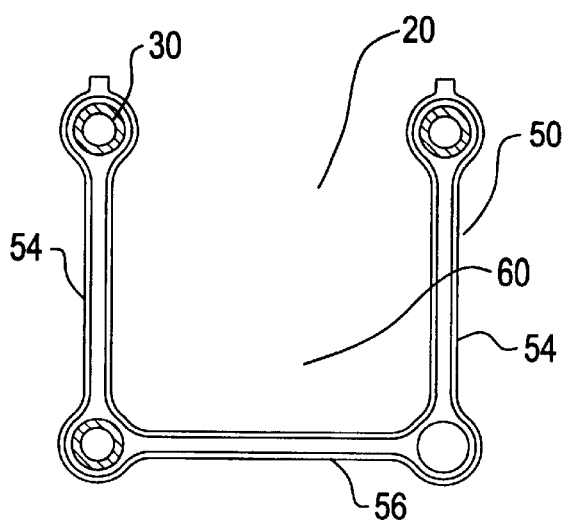
FIG. 2 is a top view of a first embodiment of an impact type particle separator according to the present invention.
Figure 3:
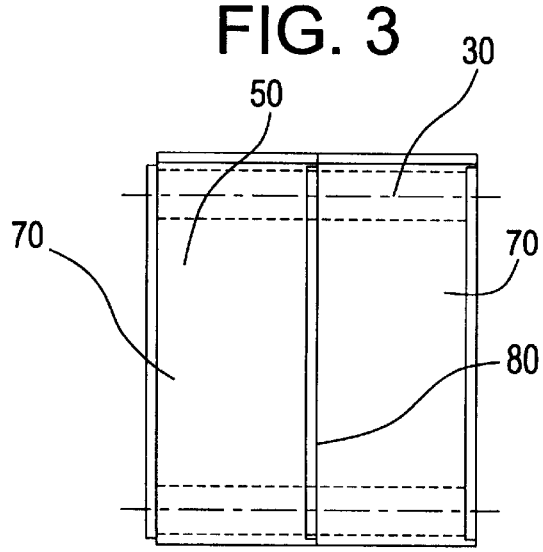
FIG. 3 is a side view of the impact type particle separator of FIG. 2.
Figure 4:
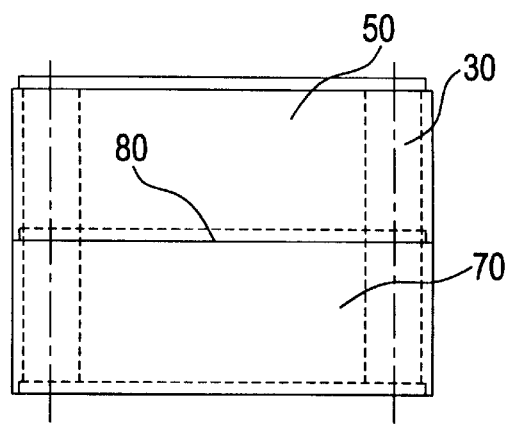
FIG. 4 is a rear view of the impact type particle separator of FIG. 2.
Figure 13:
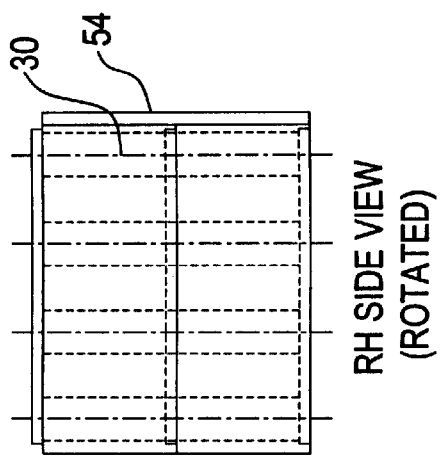
FIG. 13 is a right side view of the impact type particle separator of FIG. 10.

Referring to FIGS. 2, 3 and 4, impact type particle separator 20 is comprised of cooling tubes 30 which are arranged in a cupped configuration (as seen in FIG. 2). Cooling tubes 30 are vertically mounted in furnace 10.

Referring to FIG. 5, an upper end of each vertical cooling tube 30 forming each impact type particle separator 20 is connected to and fluidically communicates with upper header 40 of fluid circulating system 38, while a lower end of each vertical cooling tube 30 is connected to and fluidically communicates 10 with a lower header 42 of fluid circulating system 38. By fluidically connecting adjacent impact type particle separators 20 with the fluid circulating system 38 in the same manner, a plurality of parallel flow paths between upper header 40 and lower header 42 is created, allowing fluid from fluid circulating system 38 to flow through and cool each impact type particle separator 20 in parallel.

Referring back to FIGS. 2, 3 and 4, impact type particle separator 20 further comprises a slip fit element 50 surrounding each cooling tube 30 and forming collection channel 60. Slip fit element 50 includes side walls 54 and back wall 56. Side walls 54 and back wall 56 are comprised of a plurality of vertically aligned segments 70 extending longitudinally along the length of cooling tube 30, each segment 70 being connected at its ends to an adjacent segment 70. Shiplap joints 80 or other similar type connections connect vertically aligned segments 70.

The shiplap configuration at the top and bottom of each vertically aligned segment 70 prevents gas and solids from leaking between segments 70 and allows for short term and long term expansion and contraction of segment dimensions in the vertical direction.

Cooling tubes 30 provide a cooled support as well as alignment and cooling of aligned segments 70. Cooling tubes 30 further provide a unique symmetrical temperature distribution along each aligned segment 70 without distortion of the element shape which would normally be the case whenever an asymmetrical temperature distribution occurs due to asymmetrical cooling of segment 70.

Slip fit element 50 may be comprised of a low alloy metal, ceramic or other materials having high heat resistance. In one embodiment (shown in FIGS. 2, 3 and 4), the side walls and back wall comprise a single unitary piece which slips over cooling tubes 30. The single unitary piece may be a casting, weldment, fabrication or an extrusion.

Referring to FIGS. 6, 7, 8 and 9, in another embodiment, side walls 54 and back wall 56 are separate elements. The ends of side walls 54 and back wall 56 overlap and are connected together by shiplap joint 80.

Referring to FIGS. 10, 11, 12 and 13, in a further embodiment, side walls 54 and back wall 56 may comprise two elements 57 having an L-shaped cross-section. The ends of the L-shaped elements 57 overlap at the back wall 56 and are connected by shiplap joint 58 or a similar type of connection.

Figure 10:
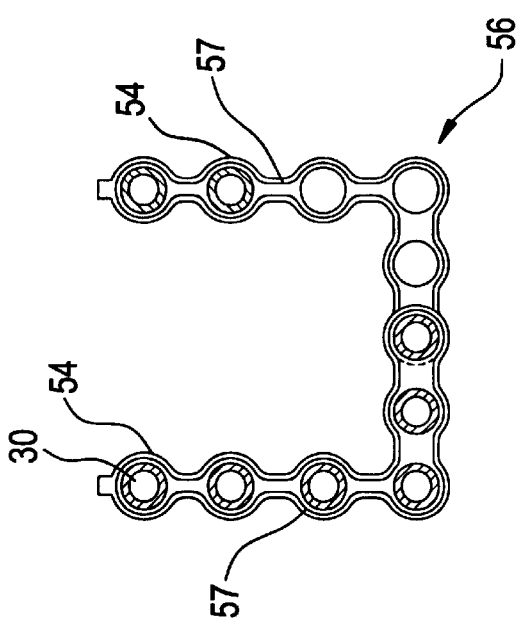
FIG. 10 is a top view of a third embodiment of an impact type particle separator according to the present invention.
Figure 12:
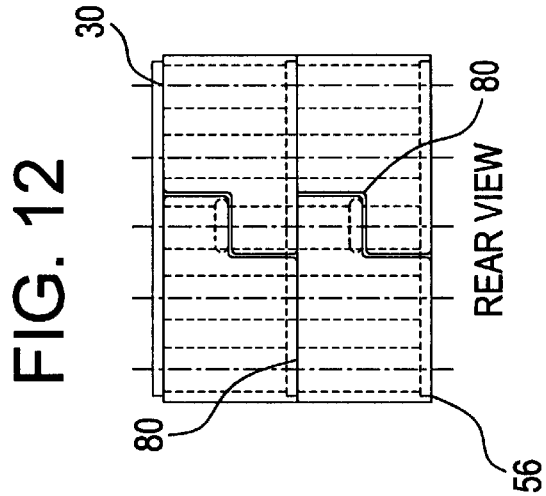
FIG. 12 is a rear view of the impact type particle separator of FIG. 10.
Figure 11:
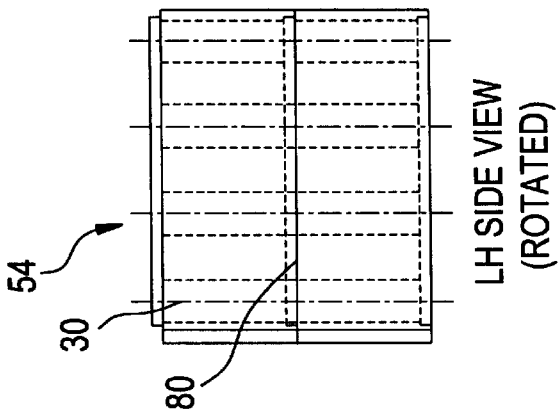
FIG. 11 is a left side view of the impact type particle separator of FIG. 10.

As shown in FIGS. 6 and 10, additional tubes may be used, as compared to FIG. 2, to support and cool the collection channel elements. By this means lower heat resistance of the material forming the slip fit element 50 may be used, while preserving the unique symmetrical temperature distribution along each aligned segment (70 etc.).

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving circulating fluidized bed reactors or combustors, or to the replacement, repair or modification of existing circulating fluidized bed reactors or combustors. In some embodiments of the invention, certain features of the invention may sometimes be used to advantage without a corresponding use of the other features. Accordingly, all such changes and embodiments properly fall within the scope of the following claims.

I claim:

1. An apparatus for separating solids from flue gas in a circulating fluidized bed (CFB) boiler, comprising:
    a plurality of impact type particle separators mounted vertically to a wall of the CFB, the impact type particle separators being adjacently positioned and horizontally spaced, each impact type particle separator including
    a plurality of vertically mounted cooling tubes, the cooling tubes being connected to a fluid circulating system,
    a slip fit element surrounding the cooling tubes, the slip fit element having a cup shaped configuration formed by side walls and a back wall, the side walls and back wall having a plurality of separate vertically aligned segments extending longitudinally along the height of the impact type particle separator, each vertically aligned segment being connected at ends thereof to an adjacent segment.

2. The apparatus according to claim 1, wherein shiplap joints connect the adjacent vertically aligned segments.

3. The apparatus according to claim 1, wherein a first end of the side wall overlaps with a second end of the back wall, and the first end and second end are connected by shiplap joints.

4. The apparatus according to claim 1, wherein the slip fit element is U-shaped, E-shaped, W-shaped or of some similar concave or cupped configuration.

5. The apparatus according to claim 1, wherein the impact type particle separators are arranged in two vertical planes that are staggered.

6. The apparatus according to claim 1, wherein the side walls and the back wall are further comprised of two segments having a L-shaped cross-section, the two segments having overlapping ends connected by a shiplap joint.

7. The apparatus according to claim 1, wherein the slip fit elements are comprised of a low alloy metal.

8. The apparatus according to claim 1, wherein the slip fit elements are comprised of ceramic.

9. The apparatus according to claim 1, wherein the slip fit elements are comprised of composite materials.

10. The apparatus according to claim 1, wherein the fluid circulating system comprises a top header and a bottom header, the cooling tubes extending between the top header and bottom header.

* * * * *